Nov. 17, 1936.    F. G. THWAITS    2,061,117
TRAILER TANK ASSEMBLAGE
Filed May 15, 1935    2 Sheets-Sheet 1
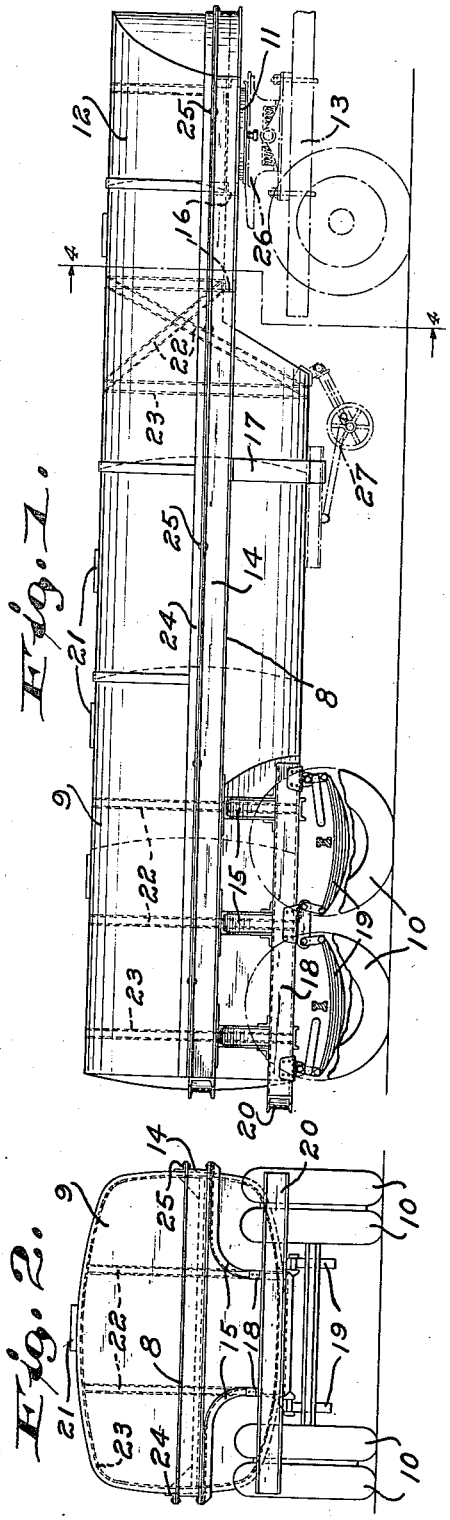
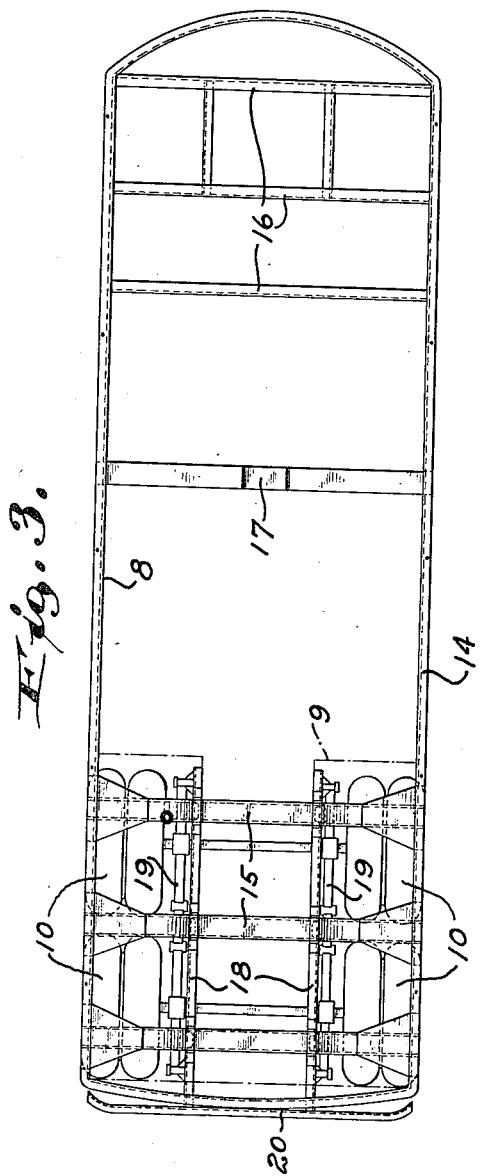
INVENTOR.
F. G. Thwaits
BY Morsell, Lieber & Morsell
ATTORNEYS.

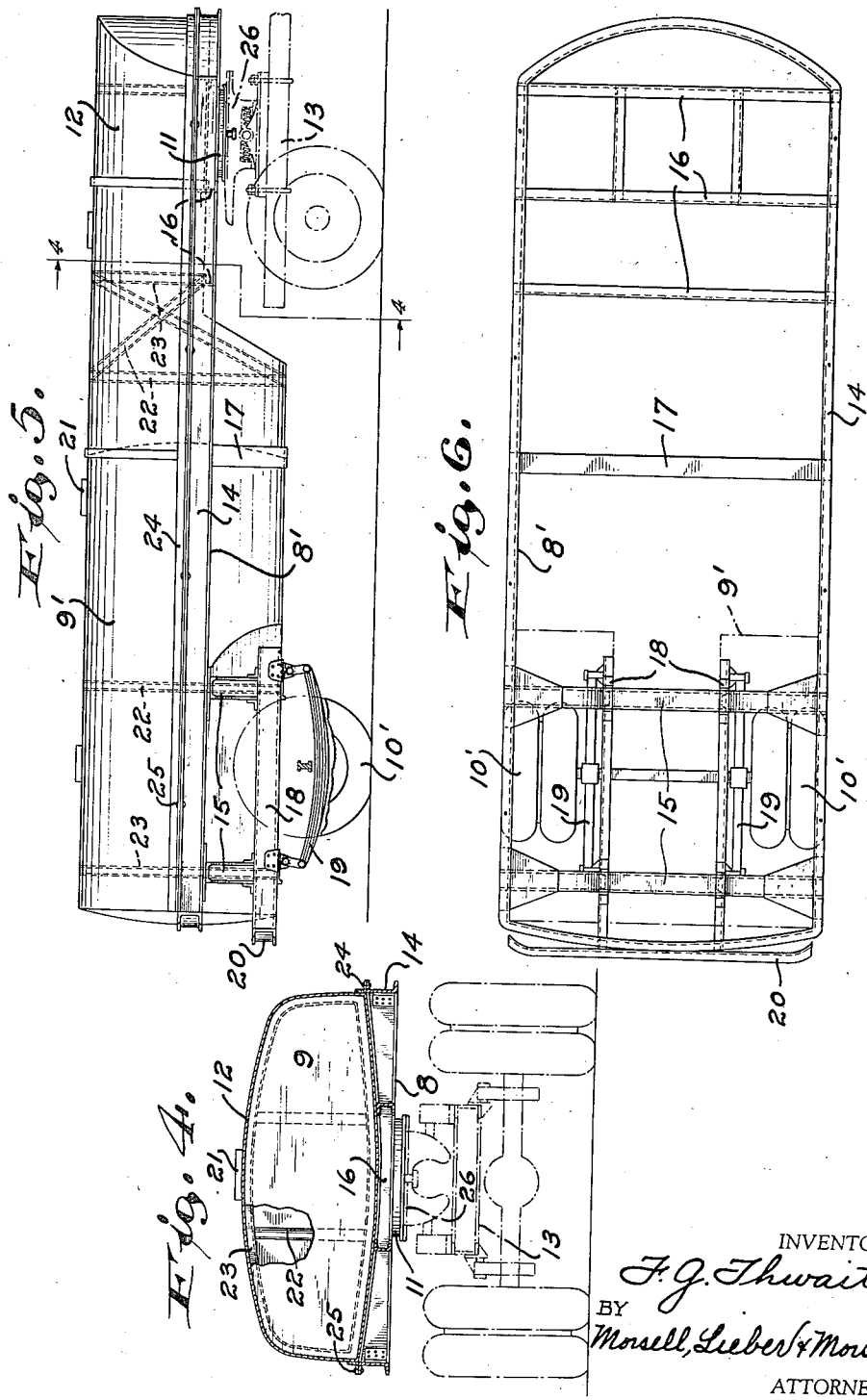

Patented Nov. 17, 1936

2,061,117

UNITED STATES PATENT OFFICE 2,061,117

TRAILER TANK ASSEMBLAGE

Frederick G. Thwaits, Wauwatosa, Wis., assignor to The Heil Co., Milwaukee, Wis., a corporation of Wisconsin Application May 15, 1935, Serial No. 21,548

8 Claims. (Cl. 280—5)

The present invention relates in general to an improvement in the art of transportation, and relates more specifically to an improved trailer tank assemblage for conveying liquids in bulk over highways, with the aid of a motor truck or the like.

Generally defined, an object of the invention is to provide a new and useful trailer tank assemblage which is simple and compact in construction, and which is moreover highly effective in actual use.

It has heretofore been common practice to provide so-called semi-trailer tanks for transporting liquids such as oil over the open highways. These prior semi-trailer tank assemblages usually consist essentially of an elongated tank having drainage piping at the bottom thereof and a forward end of reduced height, transporting wheels disposed beneath the rear portion of the tank, and a fifth-wheel attachment located beneath the forward reduced portion of the tank, the fifth-wheel attachment being cooperable with a complementary fifth-wheel element associated with the rear portion of the haulage truck.

In most of these prior semi-trailer assemblages, the lower porton of a relatively light single or multiple compartment tank, rests upon a relatively heavy undercarriage comprising supporting beams extending longitudinally beneath the tank and secured thereto, and trailer wheels and a fifth-wheel element attached directly to the supporting beams. This type of construction not only necessitated undesirable elevation of the tank and obstruction to the bottom drains thereof, but also resulted in a relatively heavy and bulky assemblage which introduced many manufacturing difficulties, since the tanks and the undercarriages for these semi-trailers are ordinarily built by different manufacturers, each specializing in the particular line of manufacture to which its contributory portion of the assemblage pertains.

While it has also heretofore been proposed to obviate some of these difficulties by attaching the trailer wheels and a fifth-wheel assemblage directly to the tank and by reenforcing the tank structure sufficiently to enable the same to sustain the load and to act as a draft member, thus eliminating the undercarriage structure entirely, this modified type of construction necessitates provision of a relatively bulky, heavy, and costly tank structure which is not sufficiently protected against possible damage. The modified assemblage moreover does not eliminate obstruction at the bottom of the tank, sufficiently to avoid interference with the drainage piping, and practically necessitates construction of the complete unit, by the tank manufacturer.

It is therefore a specific object of the present invention to provide an improved semi-trailer tank assemblage which will eliminate all of the objectionable features inherent in the above described types of semi-trailer tank assemblages.

Another specific object of the invention is to provide a trailer-tank structure of relatively light but durable construction having minimum overall height and maximum storage capacity.

A further specific object of the invention is to provide a tank trailer unit comprising a tank and a supporting and protecting cradle, which can be readily manufactured at moderate cost, and wherein the bottom of the tank is maintained free for attachment of drainage piping or the like.

Still another specific object of the invention is to provide a composite vehicular tank assembly comprising a transporting cradle and a tank structure detachably associated with the cradle, wherein the carrying frame and tank may either be produced by the same or independent manufacturers, and the unit may be readily assembled or dismantled.

An additional specific object of the present invention is to provide a trailer and tank assemblage, in which the trailer carriage serves primarily as a draft member for the assemblage, while the tank structure is sufficiently reenforced to act as a beam member for carrying the variable load, thereby producing a compact but extremely strong transporting unit.

Another specific object of the invention is to provide an effective tank carriage which may be conveniently constructed of standard structural elements such as channel and angle beams, to produce an assemblage which will meet the requirements of the various traffic and highway laws as to minimum or maximum lengths and widths of road vehicles.

These and other specific objects and advantages will be apparent from the following detailed description.

A clear conception of several specific embodiments of the invention, and of the mode of constructing and of utilizing semi-trailer tank vehicles built in accordance with the improvement, may be had by referring to the drawings accompanying and forming a part of this specification in which like reference characters designate the same or similar parts in the various views.

Fig. 1 is a side elevation of one of the improved semi-trailer tank assemblages having tandem trailer wheels portions of which have been broken away, and showing a fragment of the haulage truck and the front prop element, both in dot-and-dash lines;

Fig. 2 is a rear view of the assemblage of Fig. 1;

Fig. 3 is a top view of the cradle which constitutes a part of the assemblage of Fig. 1, showing some of the tank boundary lines in dot-and-dash lines;

Fig. 4 is a somewhat enlarged transverse vertical section through the improved semi-trailer tank assemblage, showing the rear of the haulage truck in dot-and-dash, the section being taken along the line 4—4 of Fig. 1, and also of Fig. 5;

Fig. 5 is a side elevation of another type of the improved semi-trailer tank assemblages provided with single trailer wheels; and Fig. 6 is a top view of the cradle of the semi-trailer assemblage shown in Fig. 5, showing some of the tank boundary lines in dot-and-dash lines.

While the invention has been specifically shown and described herein, as being embodied in semi-trailer tank assemblages adapted to be drawn through a standard fifth-wheel mechanism by a motor truck, the semi-trailers in each case comprising separable tank and cradle members of particular types, it is not the intent to unnecessarily restrict the scope by such specific embodiments, since some of the improved features may obviously be more generally applicable.

Referring to Figs. 1 to 4 inclusive of the drawings, the tandem wheel type of semi-trailer tank vehicle disclosed therein, comprises in general, a vehicular frame or cradle 8 forming a saddle; an elongated tank 9 adapted to set within the saddle produced by the cradle 8; rear sets of tandem trailer wheels 10 carried by the cradle 8; and a front fifth-wheel attachment 11 carried either by the cradle 8 or by the tank 9, or by both, beneath the forward reduced portion 12 of the tank.

The frame or cradle 8 is of relatively light structure acting primarily as a draft member for imparting motion from the haulage tractor or truck 13 to the supporting wheels 10, and may be constructed almost entirely of standard structural elements such as channel, angle and flat bar stock, properly formed and welded or riveted together. As specifically shown, the tank receiving cradle 8 comprises a continuous substantially horizontal upper channel member 14 adapted to snugly embrace the medial portion of the tank 9, a series of three transverse saddle beams 15 rigidly connecting the rear portions of the opposite sides of the member 14, and another series of transverse slightly dished straight beams 16 likewise rigidly interconnecting the front portions of the opposite sides of the upper member 14. In very long tank assemblages, one or more relatively light intermediate cross-braces 17 may also be provided, for the purpose of preventing undesirable spreading of the central portions of the sides of the member 14, and the rear saddle beams 15 may be interconnected by a pair of lower beams 18 which coact with the wheels 10 through leaf springs 19, and which also serve as a support for the rear bumper 20. As previously indicated, the cradle frame should have sufficient strength to sustain the draft load, without subjecting the tank 9 to undesirable longitudinal pull.

The tank 9 may be of the single or multiple compartment type, each compartment ordinarily being provided with an upper manhole 21 and with lower fluid dispensing piping, not shown, which may extend either laterally or longitudinally beneath the tank in a well known manner. The interior of the tank 9 is preferably reenforced by means of tubular braces 22 and internal peripheral channel bars 23, sufficiently to enable the completed tank structure to carry the entire beam load resulting from the weight of the tank and its contents.

The rear lower and opposite side portions of the tank 9, are cut away to clear the tandem supporting wheels 10, and the rear end of the reenforced tank rests upon the saddle beams 15 while the front reduced end 12 of the tank rests upon the straight beams 16. While the medial lower portion of the tank 9 may also bear against the cross-braces 17, the tank structure should not necessarily depend upon these cross-braces for normal support, and the greater portion of the load should preferably be carried directly by the wheels 10 and the haulage truck 13. As previously indicated, the upper channel member 14 of the carriage frame snugly embraces the tank 9 near its central horizontal plane, and the tank may be detachably confined within its supporting saddle by means of angle irons 24 secured to the opposite sides of the tank and resting directly upon the upper surface of the member 14. The angle irons 24 may be secured to the member 14 with rivets or bolts 25, removal of which will permit the tank to be lifted bodily out of the cradle 8.

The fifth-wheel element or assemblage 11 which is of relatively standard construction, may be attached either directly to the cradle beams 16 as shown in the drawings, or to the lower face of the reduced tank portion 12, or to both of these elements, and ordinarily coacts with a lower fifth-wheel element 26 carried by the rear portion of the truck 13 to complete the fifth wheel assemblage. In some cases, the upper and lower fifth-wheel elements are disconnectible, and if so, the semi-trailer tank structure, or the cradle 8, should be provided with a prop mechanism 27 of well known construction which is adapted to sustain the forward portion of the cradle 8 and tank 9 when the truck 13 is withdrawn from beneath the reduced tank portion 12.

Referring more specifically to Figs. 4 to 6 inclusive of the drawings, the single wheel-set type of semi-trailer disclosed therein, is quite similar to that previously described, and comprises a frame or cradle 8' forming an upwardly open saddle; a somewhat shorter elongated tank 9' adapted to set within the frame saddle; a set of coaxial wheels 10' carried by the rear portion of the cradle 8'; and a front fifth-wheel element or attachment 11 associated with either the cradle 8', or with the tank 9', or with both of these elements, beneath the forward reduced portion 12 of the tank.

The cradle 8' may also be formed of standard structural elements, and comprises an upper continuous channel member 14; a pair of saddle beams 15 at the rear of the member 14; and a series of slightly dished straight beams 16 at the front of the member 14. This cradle structure may again be provided with a cross-brace 17, and the rear saddle beams 15 may likewise be interconnected by lower beams 18 which coact with the wheels 10' through leaf springs 19, and which also provide a support for a bumper 20. In this embodiment the cradle 8' may again be of relatively light structure, but should be sufficiently strong to sustain the draft load without distortion.

The tank 9' may also be of the single or multiple compartment type, and each of the tank compartments has an upper manhole 21 and a lower fluid dispensing pipe of ordinary construction disposed either laterally or longitudinally beneath the tank. The interior of the tank 9' is likewise reenforced by braces 22 and bars 23 so as to enable the tank itself to sustain the entire beam load produced by the weight of the tank and its contents. The rear lower side portions of the tank 9' are also cut away to provide wheel clearance, and the rear portion of the reenforced tank rests upon the beams 15 while the front reduced portion 12 rests upon the beams 16. The tank 9' is thus supported primarily at its front and rear ends, and while the tank 9' may bear against the cross-brace 17, it does not depend upon this brace for its major support. The tank 9' besides being snugly fitting the upper channel member 14, may be detachably secured to this member by means of side angle irons 24 attached to the tank and clamped against the member 14 by bolts 25.

The fifth-wheel mechanism of the modified structure shown in Figs. 5 and 6, may be identical with that of Figs. 1 to 4 inclusive, and the tank 9' may also be provided with a prop 27 such as shown in Fig. 1.

From the foregoing description it will be apparent that the present invention provides a simple and relatively light semi-trailer assemblage comprising a reenforced tank and a cradle carriage therefor, wherein the tank may be disposed as near to the ground as possible while maintaining the lower portion thereof entirely free for the attachment of fluid dispensing piping and dispensing valve control mechanisms. The tank carrying cradle may be formed of structural steel members, and serves primarily as a draft rigging coacting with the front and rear heads of the tank for transmitting motion to the rear supporting wheels of the semi-trailer from the fifth wheel assemblage. The tank is sufficiently reenforced to permit the same to carry the beam loads, and rests primarily directly upon the rear wheels and upon the rear portion of the haulage truck 13. By providing a tank which is separable from its carriage or cradle, the tank may be readily manufactured by one manufacturer, while the cradle may be manufactured by an independent manufacturer, but both of the composite elements of the assemblage may obviously be built by the same manufacturer. The continuous upper beam member 14 will effectively prevent lateral or longitudinal displacement of the tank during normal transportation thereof, and will also protect the opposite sides of the tank against damage by impact. The improved construction also permits formation of the tank of maximum width permissible under the highway laws of various States, and the length of the tank may be varied to suit various conditions, thereby enabling the manufacturer to readily meet the requirements of the highway laws of various communities. The improved semi-trailer tank assemblage obviously eliminates all of the objectionable features inherent in the prior art structures specifically referred to herein, and provides a unit which is relatively light but durable in construction, having minimum overall dimensions for maximum storage capacity.

It should be understood that it is not desired to limit the invention to the exact details of construction herein shown and described, for various modifications within the scope of the claims may occur to persons skilled in the art.

It is claimed and desired to secure by Letters Patent:—

1. A semi-trailer tank vehicle, comprising, a cradle frame consisting of a continuous substantially horizontal upper beam and front and rear lower transverse supporting beams connecting the sides of said upper beam, a tank mounted within said cradle frame with its front and rear ends engageable with the front and rear portions of said upper beam and resting primarily upon said transverse beams, trailer wheels coacting with said rear transverse beams, and a fifth-wheel element coacting with said front transverse beams beneath a reduced forward portion of the tank.

2. A semi-trailer tank vehicle, comprising, a cradle frame consisting of a continuous upper beam and rear transverse beams forming a saddle, a tank embraced by and engageable at its opposite ends directly with said upper beam and lying in a common plane and resting within said saddle, said tank having a front portion of reduced height remote from said saddle and terminating at its bottom substantially in said plane, a fifth-wheel element coacting with the vehicle beneath said reduced tank portion, and trailer wheels coacting with the vehicle at said saddle.

3. A semi-trailer tank vehicle, comprising, a draft frame consisting of a continuous upper channel beam and rear lower transverse beams forming a saddle, an internally reenforced tank completely surrounded and snugly embraced by said upper beam and resting upon said saddle beams, said tank having a front portion of reduced height supported upon the forward portion of said upper beam, fifth-wheel structure coacting with the vehicle beneath said reduced tank portion, and supporting wheels for the vehicle carried by said saddle beams.

4. A semi-trailer tank vehicle, comprising, a frame having side draft and extreme end beams interconnected at their front and rear portions by transverse lower beams, an elongated tank mounted between said draft and end beams and having front and rear portions resting respectively upon said transverse lower beams, wheels carried by said rear transverse lower beams, a fifth-wheel element coacting with the vehicle near said front transverse lower beams, and means for detachably connecting the opposite sides of said tank to said draft beams with the tank ends engaging said end beams.

5. A semi-trailer tank vehicle, comprising, a cradle frame including a substantially continuous horizontal beam and front and rear transverse beams connecting the opposite sides of said horizontal beam, a tank snugly confined within said cradle frame with its front and rear ends engageable with the front and rear portions of said horizontal beam and resting primarily upon said transverse beams, trailer wheels coacting with said rear transverse beams, and a fifth-wheel element coacting with said front transverse beams beneath a reduced forward portion of the tank.

6. A semi-trailer tank vehicle, comprising, a cradle frame including a substantially continuous horizontal beam and front and rear transverse beams connecting the opposite sides of said horizontal beam, a tank snugly confined within said cradle frame with its front and rear ends engageable with the front and rear portions of said horizontal beam and resting primarily upon said transverse beams, trailer wheels coacting with said rear transverse beams, a fifth-wheel element coacting with said front transverse beams beneath a reduced forward portion of the tank, and means for detachably connecting the sides of said tank directly to the opposite sides of said continuous beam.

7. A semi-trailer tank vehicle, comprising, a unitary cradle frame including a continuous horizontal beam and front and rear transverse beams connecting the opposite sides of said continuous beam, said front beams being disposed considerably higher than said rear beams, a tank snugly confined within said cradle frame with its front and rear ends engageable with the front and rear portions of said horizontal beam and resting primarily upon said transverse beams, trailer wheels coacting with said rear transverse beams, and a fifth-wheel element coacting with said front transverse beams beneath a reduced forward portion of the tank.

8. A semi-trailer tank vehicle, comprising, a unitary cradle frame including a continuous horizontal beam and front and rear transverse beams connecting the opposite sides of said continuous beam, said front beams being disposed considerably higher than said rear beams, a tank snugly confined within said cradle frame with its front and rear ends engageable with the front and rear portions of said horizontal beam and resting primarily upon said transverse beams, trailer wheels coacting with said rear transverse beams, a fifth-wheel element coacting with said front transverse beams beneath a reduced forward portion of the tank, and means for detachably connecting the sides of said tank directly to the opposite sides of said continuous beam.

FREDERICK G. THWAITS.